United States Patent [19]
Wingate et al.

[11] Patent Number: 6,069,781
[45] Date of Patent: May 30, 2000

[54] DEVICE FOR PROTECTING MEDIUM VOLTAGE EQUIPMENT AGAINST VOLTAGE SURGES

[75] Inventors: Mark W. Wingate, Amarillo; F. Bryant Hawkes, Hickory Creek, both of Tex.

[73] Assignee: Maxi Volt Corporation, Inc., Amarillo, Tex.

[21] Appl. No.: 09/098,812

[22] Filed: Jun. 17, 1998

[51] Int. Cl.[7] ..................................................... H02H 3/00
[52] U.S. Cl. ............................... 361/111; 361/56; 361/58; 361/118; 361/120
[58] Field of Search .............................. 361/56, 58, 118, 361/119, 120, 124, 103, 127, 111

[56] References Cited

U.S. PATENT DOCUMENTS 4,616,286  10/1986  Breece ..................................... 361/56

*Primary Examiner*—Stephen W. Jackson
*Attorney, Agent, or Firm*—Carr & Storm, L.L.P.

[57] ABSTRACT

Suppression of transient voltage surges in an electrical power-carrying line is achieved by a voltage surge suppressor having a capacitor, varistor, and gas tube connected in parallel between the line and a current carrying conductor. The invention is effective for suppressing transient voltage surges more reliably, efficiently, and safely than is possible using primary arrestors or serially connected varistors in accordance with conventional technology. The invention may be adapted for use on medium voltage lines carrying either single-phase or three-phase electrical power.

20 Claims, 1 Drawing Sheet

DEVICE FOR PROTECTING MEDIUM VOLTAGE EQUIPMENT AGAINST VOLTAGE SURGES

FIELD OF THE INVENTION

The invention relates generally to a method and device for suppressing transient voltage surges and, more particularly, to a medium voltage surge protection device effective for protecting electrical equipment, operating between about 1,500 volts and about 4,160 volts, from voltage surges.

BACKGROUND OF THE INVENTION

A number of different tools and types of electrical equipment require three-phase electrical power having medium voltage, ranging from about 1,500 to 4,160 volts, to operate. Such tools and equipment include, for example, fans, motors, and submersible pumps. When such tools experience failure, they can be difficult and expensive to repair and/or replace. Furthermore, while they are being repaired and/or replaced, other systems dependent on them may be rendered inoperable, thereby resulting in down time, and lost productivity and profits.

Failure of the foregoing tools and equipment commonly results from electrical failure, such as from transient voltage spikes and surges in electrical power used to operate such tools and equipment. A spike occurs when an amount of voltage which is higher than normal in a line occurs for a very short period of time (e.g., less than 50 microseconds). A surge occurs when an amount of voltage which is higher than normal in a line persists for an extended period of time (e.g., more than 50 microseconds). The term "surge" will be used herein to refer to both spikes and surges. Surges may be caused by many different factors, such as static electricity, (e.g., lightning, dust storms, wind, and the like), tree limbs falling on power lines, a car hitting an electric pole, inductive load switching (e.g., turning on and off electrical equipment), and the like. Because there are a number of possible sources of surges which can cause electrical equipment and tools to fail, it is important to be able to suppress such voltage surges.

Conventionally, transient voltage surges to medium voltage electrical equipment are controlled by primary arrestors set at primary voltages ranging, for example, from about 10,000 volts to about 15,000 volts. Such voltage settings are too high for sensitive medium voltage equipment and, as a result, such equipment is not reliably protected and is vulnerable to electrical damage and failure.

Accordingly, a continuing search has been directed to the development of transient voltage surge suppressors which respond quickly enough and absorb sufficient energy to prevent medium voltage electrical equipment from being damaged.

SUMMARY OF THE INVENTION

According to the present invention, suppression of transient voltage surges in an electrical power-carrying line is improved by a voltage surge suppressor having a capacitor, varistor, and gas tube connected in parallel between the power-carrying line and a common bus. The invention is effective for suppressing transient voltage surges more reliably, efficiently, and safely than is possible using primary arrestors or serially connected varistors in accordance with conventional technology. The invention may be adapted for use on medium voltage lines carrying either single-phase or three-phase electrical power.

BRIEF DESCRIPTION OF THE DRAWING

For a more complete understanding of the present invention, and the advantages thereof, reference is now made to the following description taken in conjunction with the accompanying drawing, in which.

DESCRIPTION OF THE PREFERRED EMBODIMENT

Figure 1:
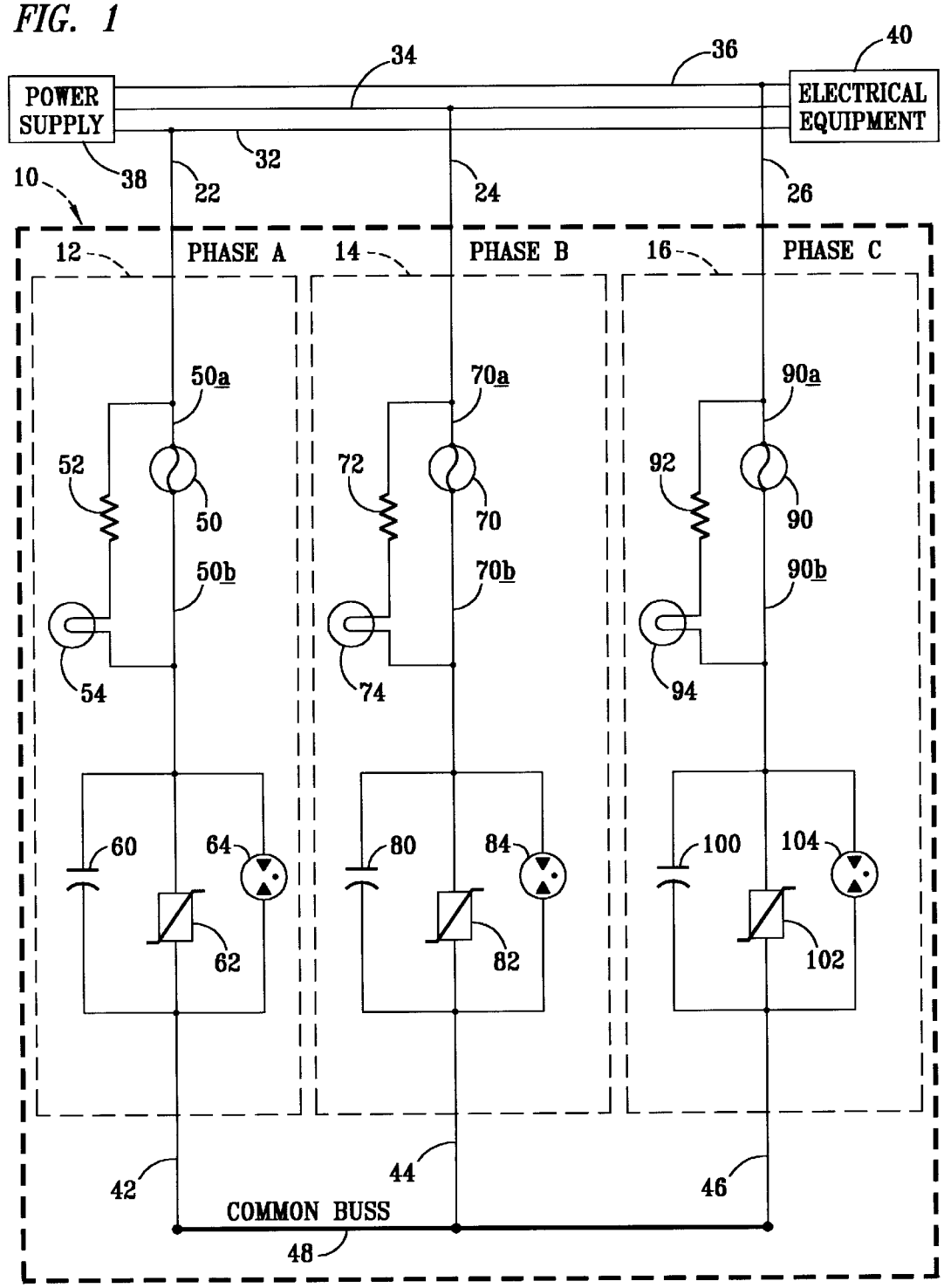
FIG. 1 is a schematic diagram of a voltage surge suppressor embodying features of the present invention.

Referring to FIG. 1 of the drawings, the reference numeral 10 generally designates a medium voltage surge protection device embodying features of the present invention. The device 10 includes a first circuit 12, a second circuit 14, and a third circuit 16, each of which are identified in dashed outline. The first circuit 12 includes a first terminal 22 connected to a first line 32 of a three-phase power supply 38, which supplies from about 1,500 to about 4,160 volts, phase-to-phase typically about 1,500 volts, 2,500 volts, or 3,600 volts, of potential to electrical equipment 40 such as a medium voltage motor and pump, or the like. Similarly, the second circuit 14 includes a first terminal 24 connected to a second line 34 of the three-phase power supply 38, and the third circuit 16 includes a first terminal 26 connected to a third line 36 of the medium voltage, three-phase, delta power supply 38. Each of the circuits 12, 14, and 16 further includes a second terminal 42, 44, and 46, respectively, connected together to a common bus 48, i.e., a current carrying conductor (not a neutral or a ground).

The first circuit 12 comprises a conventional fuse 50, such as a dielectric dissipative element made by Busman, Part Number HVU, having a first terminal 50a connected to the first terminal 22 of the first circuit 12. The fuse 50 is rated at about 0.5 amperes and between 2,500 and 5,000 KVA (kilo volt amperes). A resistor 52 and indicator light 54 are serially connected together and are connected in parallel with the fuse 50 between the first terminal 50a of the fuse 50 and a second terminal 50b of the fuse 50. The resistor 52 is a conventional resistor sized to provide about 500 million ohms of resistance on about 10 watts of power. The indicator light 54 is preferably a neon light configured to operate on 120 volts, though the light 54 may be any of a number of different types of lights or alarms such as a buzzer, a horn, or the like.

A capacitor 60, a varistor 62, and a gas tube 64 are connected in parallel between the second terminal 50b of the fuse 50 and the second terminal 42 of the first circuit 12. The capacitor 60 is preferably a conventional metal foil ceramic type of capacitor rated at about 2,500 pF. The varistor 62 is preferably a metal oxide semi-conductor 60 mm (millimeter) varistor rated according to the voltage for which the device 10 is rated. For example, if the device 10 is rated for 1,500 volts, then the varistor 62 is preferably rated for about 1,700 volts, 4,300 volts peak nominal clamping voltage, and 3,200 joules; if the device 10 is rated for 2,500 volts, then the varistor 62 is preferably rated for about 3,484 volts, 2,800 volts peak nominal clamping voltage, and 7,500 joules; if the device 10 is rated for 3,600 volts, then the varistor 62 is preferably rated for about 5,244 volts, 7,400 volts peak nominal clamping voltage, and 9,600 joules. Such varistors are available from Harris/RCA at a number of different locations such as, for example, Florida. The gas tube 64 is rated for 6,500 volts and is hermetically sealed to prevent a gas, such as neon, contained therein from escaping. The gas tube 64 is rated to absorb a large quantity of electrical energy by exciting the gas contained therein, preferably absorbing at least 2.5 million joules of energy. Such gas tubes are available from C. P. Clare, Inc. located in Chicago, Ill. The foregoing fuse 50, resistor 52, indicator light 54, capacitor 60, varistor 62, and gas tube 64 are considered to be well known to a skilled artisan based upon a review of the present description of the invention, and will therefore not be described in further detail herein.

The circuits 14 and 16 and components therein are substantially similar to the circuit 12 and the components described therein and, therefore, for the sake of conciseness, will be described only briefly. Accordingly, the circuit 14 comprises a fuse 70 having a first terminal 70a connected to the first terminal 24 of the second circuit 14. A resistor 72 and indicator light 74 are serially connected together and are connected in parallel with the fuse 70 between the first terminal 70a of the fuse 70 and a second terminal 70b of the fuse 70. A capacitor 80, a varistor 82, and a gas tube 84 are connected in parallel between the second terminal 70b of the fuse 70 and the second terminal 44 of the second circuit 14.

The circuit 16 comprises a fuse 90 having a first terminal 90a connected to the first terminal 26 of the third circuit 16. A resistor 92 and indicator light 94 are serially connected together and are connected in parallel with the fuse 90 between the first terminal 90a of the fuse 90 and a second terminal 90b of the fuse 90. A capacitor 100, a varistor 102, and a gas tube 104 are connected in parallel between the second terminal 90b of the fuse 90 and the second terminal 46 of the third circuit 16.

In the operation of the device 10, if the electrical equipment 40 is not experiencing any surges in the three phase power supplied by the power supply 40 onto the lines 32, 34, and 36, then substantially no energy is absorbed by the device 10, none of the circuits 12, 14, or 16 are activated, no current is reflected, and no voltage is absorbed. If there is a surge, it will generally occur on only one of the lines 32, 34, or 36. While two or three of the lines 32, 34, and 36 could simultaneously experience a surge, such is the exception. Whether one, two, or three of the lines 32, 34, and/or 36 experience a surge, each of the circuits 12, 14, and 16 respond substantially similarly to a surge which occurs on a respective line 32, 34, and 36. Therefore, in the interest of conciseness, operation of the circuits 12, 14, and 16 which be described representatively by the response of the circuit 12 to a surge.

Accordingly, as soon as a surge appears on the line 32, the circuit 12 is activated. The fuse 50 passes the surge in power to the parallel-connected capacitor 60, varistor 62, and gas tube 64. Since the resistor 52 has a relatively high resistance, current does not initially flow through the resistor 52, and the indicator light 54 is, thus, not initially illuminated. The capacitor 60 absorbs a small portion of the surge energy and is also effective for "dampening" the waveform of the surge received from the line 32, thereby enabling the varistor 62 to respond more efficiently to the surge. The varistor 62 absorbs a greater amount of the energy of the surge than the capacitor 60. Prior to exceeding the energy rating of the varistor 62, gas in the gas tube 64 is excited and absorbs energy that has not been absorbed by the capacitor 60 and the varistor 62, generally, up to about 2,500,000 joules. If the energy of the surge exceeds the capacity of the gas tube 64 to absorb the energy, e.g., if it exceeds 2,500,000 joules, then the lead current through the circuit 12 will open the fuse 50, thereby preventing the circuit 12 from exploding, and causing current to flow through the resistor 52 and to illuminate the light 54 to provide notice that the fuse 50 has opened. When there is a surge in the line 32, a portion of the current in the line is also reflected through the bus 48 and the second terminals 44 and 46 to the other two circuits 14 and 16, respectively. Typically, such current will flow to the one of the circuits 14 or 16 having the least resistance, and sharing between the circuits 14 and 16 would be atypical.

It can be appreciated that, as mentioned above, if there is a surge on one of the lines other than the line 32, i.e., on either line 34 or 36, then the operation of the circuit 14 or 16, respectively, would be similar to the operation of the circuit 12 discussed in the foregoing.

By the use of the present invention shown in FIG. 1, an improved system and method is provided for effectively suppressing transient voltage surges more reliably, efficiently, and safely than is possible using primary arrestors or serially connected varistors in accordance with conventional technology. More specifically, with reference to the circuit 12, the device 10 is more efficient because the capacitor 60 dampens the waveform of the surge entering the varistor 62, thereby enabling the varistor to operate more efficiently. The gas tube 64 enables the device 10 to operate more reliably because it will absorb up to about 2,500,000 joules of energy. The fuse 50 enables the device 10 to operate more safely since it prevents the circuit 12 from violently exploding.

It is understood that the present invention can take many forms and embodiments. Accordingly, several variations may be made in the foregoing without departing from the spirit or the scope of the invention. For example, the device 10 may be adapted for single-phase power by removing one circuit, such as the third circuit 16. In another variation, the device 10 may be operated without the serially connected resistors 52, 72, and 92 and the lights 54, 74, and 94. The device 10 could also be operated without the fuses 50, 70, and 90, though with some risk of danger of explosion.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

Having thus described the invention, what is claimed is:

1. A voltage surge protection device adapted for suppressing a transient voltage surge on at least one line of three lines configured for carrying power from a medium voltage three-phase delta power supply, the device comprising:

a first connector having a first terminal connected to a first line of the three lines carrying power from the medium voltage three-phase delta power supply;

a first circuit comprising a first capacitor, a first varistor, and a first gas tube connected in parallel between a second terminal of the first connector and an ungrounded common bus;

a second connector having a first terminal connected to a second line of the three lines carrying power from the medium voltage three-phase delta power supply;

a second circuit comprising a second capacitor, a second varistor, and a second gas tube connected in parallel between a second terminal of the second connector and the ungrounded common bus;

a third connector having a first terminal connected to a third line of the three lines carrying power from the medium voltage three-phase delta power supply; and a third circuit comprising a third capacitor, a third varistor, and a third gas tube connected in parallel between a second terminal of the third connector and the ungrounded common bus.

2. The device of claim 1 wherein the first connector is a first wire, the second connector is a second wire, and the third connector is a third wire.

3. The device of claim 1 wherein the first connector is a first fuse, the second connector is a second fuse, and the third connector is a third fuse.

4. The device of claim 1 wherein the first connector is a first fuse connected in parallel with a serially connected first resistor and first indicator device, the second connector is a second fuse connected in parallel with a serially connected second resistor and second indicator device, and the third connector is a third fuse connected in parallel with a serially connected third resistor and third indicator device.

5. The device of claim 1 wherein the first connector is a first fuse connected in parallel with a serially connected first resistor and first indicator light, the second connector is a second fuse connected in parallel with a serially connected second resistor and second indicator light, and the third connector is a third fuse connected in parallel with a serially connected third resistor and third indicator light.

6. The device of claim 1 wherein:
the first circuit and the second circuit are electrically connected in series through the common bus;
the first circuit and the third circuit are electrically connected in series through the common bus; and
the second circuit and the third circuit are electrically connected in series through the common bus.

7. The device of claim 1 wherein the power supply is rated for supplying from about 1,500 volts to about 4,160 volts of voltage.

8. The device of claim 1 wherein the gas tube contains neon gas.

9. The device of claim 1 wherein the gas tube is configured to absorb at least about 2,000,000 joules of energy.

10. The device of claim 1 wherein the varistor is a metal oxide varistor.

11. The device of claim 1 wherein the capacitor is a foil type ceramic capacitor.

12. A voltage surge protection device adapted for suppressing a transient voltage surge on at least one line of three lines configured for carrying power from a medium voltage three-phase delta power supply, the device comprising:
a first connector having a first connector terminal connected to a first line of the three lines carrying power from the power supply;
a first circuit comprising a first capacitor, a first varistor, and a first gas tube connected in parallel between a second connector terminal of the first connector and a first terminal of the first circuit;
a second connector having a first connector terminal connected to a second line of the three lines carrying power from the power supply;
a second circuit comprising a second capacitor, a second varistor, and a second gas tube connected in parallel between a second connector terminal of the second connector and a first terminal of the second circuit;
a third connector having a first connector terminal connected to a third line of the three lines carrying power from the power supply;
a third circuit comprising a third capacitor, a third varistor, and a third gas tube connected in parallel between a second connector terminal of the third connector and a first terminal of the third circuit; and
an ungrounded common bus electrically connected only to the first terminal of the first circuit, to the first terminal of the second circuit, and to the first terminal of the third circuit for carrying current between the first circuit, the second circuit, and the third circuit.

13. The device of claim 12 wherein the first connector is a first wire, the second connector is a second wire, and the third connector is a third wire.

14. The device of claim 12 wherein the first connector is a first fuse, the second connector is a second fuse, and the third connector is a third fuse.

15. The device of claim 12 wherein the first connector is a first fuse connected in parallel with a serially connected first resistor and first indicator device, the second connector is a second fuse connected in parallel with a serially connected second resistor and second indicator device, and the third connector is a third fuse connected in parallel with a serially connected third resistor and third indicator device.

16. The device of claim 12 wherein the first connector is a first fuse connected in parallel with a serially connected first resistor and first indicator light, the second connector is a second fuse connected in parallel with a serially connected second resistor and second indicator light, and the third connector is a third fuse connected in parallel with a serially connected third resistor and third indicator light.

17. The device of claim 12 wherein the first circuit is electrically connected in series via the common bus with at least one of the second and third circuits whenever a transient surge is dissipated by at least one of the first, second and third circuits.

18. The device of claim 12 wherein the power supply is rated for supplying from about 1,500 volts to about 4,160 volts of voltage.

19. The device of claim 12 wherein the gas tube is configured to absorb at least about 2,000,000 joules of energy.

20. A voltage surge protection device adapted for suppressing a transient voltage surge on a first power line of at least two power lines configured for carrying power from a power supply, the device comprising:
a connector having a first terminal connected to the line carrying power from the power supply; and
a circuit including a capacitor, a varistor, and a gas tube, connected in parallel between a second terminal of the connector and a current-carrying conductor electrically connectable in series to another of the at least two power lines via an additional circuit.

* * * * *